J. W. BEACOM.
SCOOP.
APPLICATION FILED MAR. 27, 1918.
1,289,087.
Patented Dec. 31, 1918.
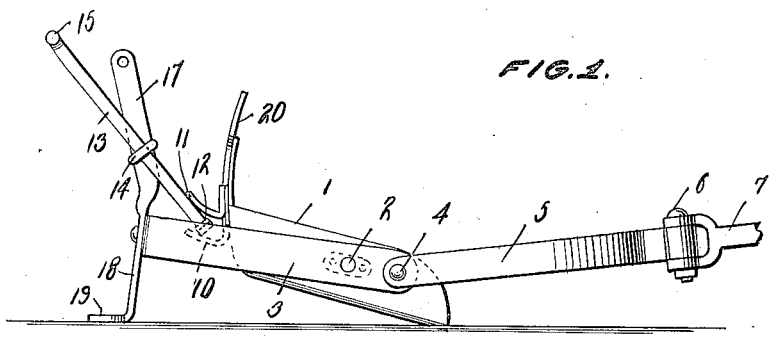
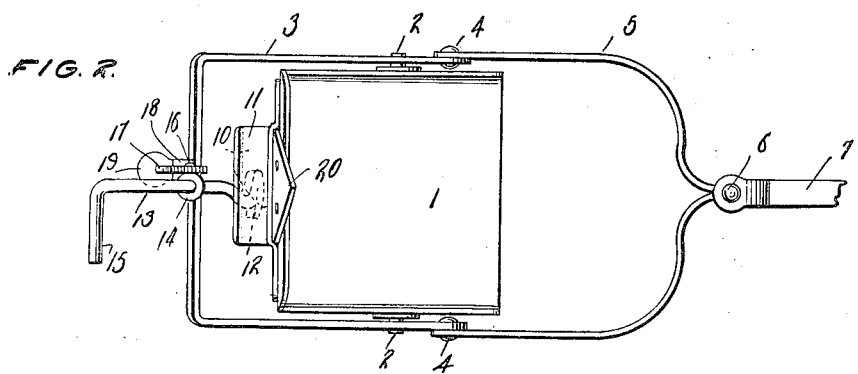
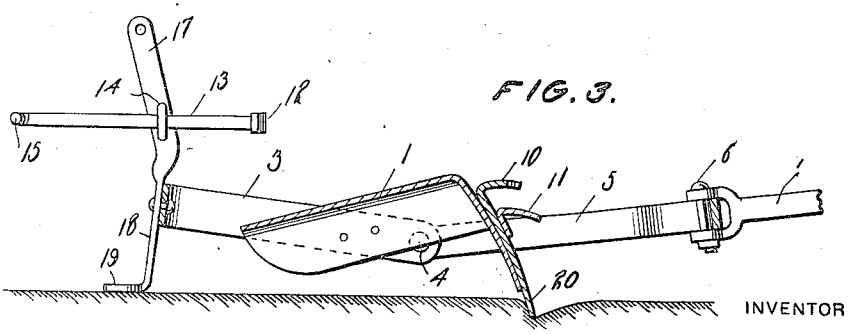
INVENTOR
John W. Beacom
WITNESSES
BY
ATTORNEY

UNITED STATES PATENT OFFICE.

JOHN W. BEACOM, OF NEVILLE, SASKATCHEWAN, CANADA.

SCOOP.

1,289,087.  Specification of Letters Patent.  Patented Dec. 31, 1918.

Application filed March 27, 1918. Serial No. 225,007.

*To all whom it may concern:*

Be it known that I, JOHN W. BEACOM, a subject of the King of Great Britain, residing at Neville, in the Province of Saskatchewan and Dominion of Canada, have invented certain new and useful Improvements in Scoops, of which the following is a specification.

This invention relates to excavating, and more especially to scoops drawn by power or by horses and intended to be dumped; and the object of the same is to provide improved mechanism for holding the scoop at one position and for causing it to dump at times.

This object is carried out by constructing the framework in the manner hereinafter more fully described and claimed, and as shown in the drawings, wherein:—

Figure 1 is a side elevation of this scoop complete, and

Fig. 2 is a plan view thereof, the scoop being shown in its carrying position,

Fig. 3 is a longitudinal sectional view showing the scoop after it has been dumped.

In the drawings I have designated the scoop proper by the numeral 1 and have employed the numeral 2 for indicating the trunnions at its opposite sides. These trunnions are journaled in the sides of the rear U-shaped member 3 of a frame, and the front ends of this member are pivotally connected at 4 to the rear ends of a second U-shaped member 5 of this frame, which member constitutes a yoke and is connected at 6 to the draft mechanism broadly indicated by the numeral 7. No novelty is claimed for the draft, which may be animal power, horse power or anything that is convenient. The two part frame 3 and 5 surrounds and incloses the scoop 1 whose trunnions 2 are pivotally mounted in the rear part of the frame as seen in Fig. 2, and when draft is applied at 7, the scoop is drawn along the ground and gathers up a load which is carried forward in the body of the scoop until the latter is dumped, all in a manner well understood to those who are experienced in excavating. It is the object of those who construct scoops of this character to so dispose them within their frame or mount them within the yoke that they may be held in carrying position as shown in Fig. 1, with comparative ease, and yet that the operator who travels behind may readily put the scoop in the position shown in Fig. 3 without having to personally lift the load in order to accomplish dumping. For the purpose of holding the scoop in carrying position and at times releasing it, I have constructed the mechanism described below.

On the back of the scoop body I provide a pair of flanges or lips 10 and 11 projecting rearward and inclined slightly upward as best seen in Fig. 1 and producing between them a transverse channel. Within this channel stands the head 12 which is formed at the front end of the handle 13 whose body is rotatably mounted in an eye 14 and extends rearward and upward to a crank 15. The shank 16 of the eye 14 is in turn pivotally mounted within a bracket 17 so that the eye may swivel or turn therein, and the handle 13 may be slipped longitudinally through the eye. Thus this handle is permitted to have several movements. When it stands as seen in Fig. 1, its transverse head 12 lies between the lips 10 and 11 and the scoop is maintained in about the position shown in this view, and in Fig. 2. When the rear end of the handle is borne downward, the handle rocks over and slides through the eye as a fulcrum pivot, and the head 12 rises so that the rear end of the scoop is raised while its body turns on its trunnions 2. This naturally causes the front end of the scoop to be thrown downward into the ground and to be caught by the same as the draft continues, and the result is that the scoop is eventually thrown over to the dumping position illustrated in Fig. 3, and this dumping of the scoop takes place automatically and without the operator having to lift the load of the scoop except for a very little at first. The handle 13 may be slipped backward through the eye sufficiently to permit the scoop to be restored to its original position, either by being turned backward on its trunnions or by being caused to make a complete revolution within the frame. For this latter the flange at the rear end of the scoop may be provided with an upstanding pointed projection 20 constituting a spur which will be thrown over into the ground as seen in Fig. 3 when the scoop is dumped, and therefore further draft will cause the scoop to make a complete revolution in a manner which will be clear.

I do not wish to be limited to details of construction further than as required by the claims appended. I do not wish to be limited to the sizes, proportions, and materials of parts, and it is quite obvious that the scoop can embody other features than herein set forth and can be used for purposes without departing from the spirit of my invention. I have also shown in the drawings how the bracket 17 might be continued downward as at 18 and formed into a foot 19 to travel on the surface of the earth or roadway and support the rear end of the frame if desired.

What I claim as my invention is:—

1. In a dumping scoop structure, the combination with a frame, a scoop whose body has side trunnions rotatably mounted in said frame, and a pair of lips projecting rearward and upward from the scoop body; of a bracket rising from the rear end of said frame, an eye swivelly mounted in said bracket, and a handle slidably and rotatably passing through said eye and having a head at its front end removably engaging the space between said lips, for the purpose set forth.

2. In a dumping scoop, the combination with a frame, a scoop having lateral trunnions journaled therein, and a pair of lips projecting from the rear of the scoop body; of a handle having a transverse head at its front end removably engaging the space between said lips and a crank at its rear end, and an eye at the rear of the frame in which the handle is rotatably mounted, for the purpose set forth.

3. In a dumping scoop, the combination with a frame, a scoop having lateral trunnions journaled therein, and a pair of lips projecting from the rear of the scoop body; of a bracket rising from the rear of the frame, a handle having a transverse head at its front end removably engaging the space between said lips, and a crank at its rear end, a bracket rising rigidly from the rear of the frame, an eye whose crank is swiveled in said bracket and whose body slidably embraces the handle, and a foot carried by the lower end of the bracket and holding the rear end of the frame normally off the ground.

4. In a dumping scoop, the combination with the scoop proper having trunnions at its sides; of a frame made up of two U-shaped members pivotally connected with each other and within one of which said trunnions are journaled, a draft attached to the other member, a bracket carried by the rear member and having a pendent foot traveling on the ground, and scoop-holding mechanism mounted in said bracket.

In testimony whereof I affix my signature in presence of two witnesses.

JOHN W. BEACOM.

Witnesses:
B. T. PEARSON,
JAMES A. MCKENNA.

Copies of this patent may be obtained for five cents each, by addressing the "Commissioner of Patents, Washington, D. C."